United States Patent
Kemeny et al.

(10) Patent No.: US 9,695,383 B2
(45) Date of Patent: Jul. 4, 2017

(54) PROCESS FOR REGENERATING FILTER AID USED IN A WINTERIZATION PROCESS

(71) Applicant: BUNGE NÖVÉNYOLAJIPARI ZÁRTKÖRUEN MUKÖDO RÉSZVÉNYTÁRSASÁG, Budapest (HU)

(72) Inventors: Zsolt Kemeny, Budapest (HU); Stéphane Golinski, Coudekerque-Branche (FR); Oleg Bereznev, Voronezh (RU); Andrey Makarenko, Toronto (CA)

(73) Assignee: BUNGE NÖVÉNYOLAJIPARI ZÁRTKÖRUEN MUKÖDO RÉSZVÉNYTÁRSASÁG, Budapest (HU)

(*) Notice: Subject to any disclaimer, the term of this patent is extended or adjusted under 35 U.S.C. 154(b) by 0 days.

(21) Appl. No.: 14/431,520

(22) PCT Filed: Sep. 25, 2013

(86) PCT No.: PCT/EP2013/069898
§ 371 (c)(1),
(2) Date: Mar. 26, 2015

(87) PCT Pub. No.: WO2014/048943
PCT Pub. Date: Apr. 3, 2014

(65) Prior Publication Data
US 2015/0240185 A1    Aug. 27, 2015

(30) Foreign Application Priority Data
Sep. 27, 2012   (EP) .................... 12186291

(51) Int. Cl.
*C11B 13/04*   (2006.01)
*B01D 37/02*   (2006.01)
(Continued)

(52) U.S. Cl.
CPC ............. *C11B 13/04* (2013.01); *B01D 29/39* (2013.01); *B01D 29/62* (2013.01); *B01D 29/66* (2013.01);
(Continued)

(58) Field of Classification Search
CPC ........ B01D 41/04; B01D 29/56; B01D 29/78; B01D 41/02; B01D 37/02; B01D 29/39;
(Continued)

(56) References Cited

U.S. PATENT DOCUMENTS 2,979,204 A * 4/1961 Yeiser ................... B01D 29/05
                                                                    210/197
4,049,685 A   9/1977 Smith et al.
(Continued)

FOREIGN PATENT DOCUMENTS

DE        32 15 116 A1   10/1983
DE        40 02 161 A1    8/1991
WO    2006/004454 A1     1/2006

OTHER PUBLICATIONS

Mar. 31, 2015 International Preliminary Report on Patentability issued in International Patent Application No. PCT/EP2013/069898.

*Primary Examiner* — Katherine Zalasky
*Assistant Examiner* — Benjamin Lebron
(74) *Attorney, Agent, or Firm* — Oliff PLC

(57) ABSTRACT

The present invention relates to a process for in situ regeneration of spent filter aid including the steps of: a) circulating through a spent filter aid cake in a circulation loop a regenerating oil at a temperature of from 40° C. to 100° C., in a regenerating oil/spent filter aid (v/w) ratio of from 0.3/1 to 12/1; b) removing the regenerating oil from the treated spent filter aid cake; and c) recovering the regenerated filter aid.

8 Claims, 2 Drawing Sheets

(51) Int. Cl.
*B01D 29/39* (2006.01)
*B01D 29/62* (2006.01)
*B01D 29/66* (2006.01)
*B01J 20/34* (2006.01)
*C11B 7/00* (2006.01)
*B01D 41/04* (2006.01)
*B01J 20/14* (2006.01)
*B01J 20/24* (2006.01)
*B01J 20/10* (2006.01)

(52) U.S. Cl.
CPC ............. *B01D 37/02* (2013.01); *B01D 41/04* (2013.01); *B01J 20/106* (2013.01); *B01J 20/14* (2013.01); *B01J 20/24* (2013.01); *B01J 20/3425* (2013.01); *B01J 20/3433* (2013.01); *B01J 20/3475* (2013.01); *C11B 7/0075* (2013.01); *C11B 7/0083* (2013.01); *B01J 2220/4825* (2013.01); *Y02W 30/74* (2015.05)

(58) Field of Classification Search
CPC .......... B01D 29/62; B01D 29/66; B01J 20/34; B01J 20/24; B01J 20/14; B01J 20/12; B01J 20/106; B01J 20/3425; B01J 20/3433; B01J 20/3475; C11B 13/04; C11B 7/0083; C11B 15/00; C11B 3/008; C11B 7/0075

See application file for complete search history.

(56) References Cited

U.S. PATENT DOCUMENTS

| | | | | |
|---|---|---|---|---|
| 4,469,805 | A * | 9/1984 | Kofke, Jr. | C10G 25/12 208/254 R |
| 5,013,461 | A * | 5/1991 | Drori | B01D 29/114 210/193 |
| 5,271,851 | A * | 12/1993 | Nelson | B01D 29/39 210/193 |
| 5,358,915 | A * | 10/1994 | Nebergall | B01J 20/12 502/22 |
| 5,482,633 | A * | 1/1996 | Muraldihara | B01D 61/147 210/333.01 |
| 6,355,173 | B1 * | 3/2002 | den Bieman | B01D 65/02 210/636 |
| 2003/0201228 | A1 | 10/2003 | Chanrai et al. | |
| 2007/0175091 | A1 * | 8/2007 | Danzer | C07C 67/56 44/621 |
| 2010/0032372 | A1 * | 2/2010 | Adam | B01D 37/02 210/635 |

* cited by examiner

PROCESS FOR REGENERATING FILTER AID USED IN A WINTERIZATION PROCESS

The present invention relates to a process for regenerating filter aids used in oil winterization process.

Crude vegetable oils contain certain components and impurities which can cause undesirable appearance and/or flavor in the final refined oil. The conversion of crude vegetable oils into high quality refined oil product therefore require several treatment steps including degumming, neutralization, predewaxing, washing, bleaching, winterization and deodorization.

Crude vegetable oils may in particular contain waxes that are esters of long chain fatty acids containing 20 to 28 carbon atoms and long chain fatty alcohols containing 22 to 30 carbon atoms. For example, crude sunflower oil obtained after pressing and extracting seeds may contain up to 1500 mg/kg waxes.

Although these waxes are soluble in oil, they tend to crystallize at room temperature or lower, causing turbidity in the final refined oil whereas bottled refined oil products must remain crystal clear during storage and application.

Presence of crystallized waxes in the final refined oil makes the oil appearance unacceptable and lowers its commercial value. It is thus required to remove waxes from the crude vegetable oils so that the final refined oil remains clear at storage temperature.

Two main processes exist for removing wax from oils: the wet dewaxing and the dry dewaxing. One or both processes can be used when refining oil, depending on the initial wax content of the crude oil and on the overall refining technology used.

The wet dewaxing, often referred to as predewaxing, consists in cooling oil in presence of a water phase allowing wax crystallization in a series of holding tanks. The formed crystals are then removed by centrifugation.

The dry dewaxing, also referred to as winterization process, consists in cooling oil, thus allowing wax crystallization in a series of crystallization and maturation tanks. The formed crystals are then removed by filtration. Winterization processes are generally conducted using horizontal pressure leaf filters. Vertical filters may nevertheless also be used.

Filter aids are used to facilitate winterization process helping in the nucleation or crystal seeding and/or facilitating the filtration. Two categories of filter aid can be reported:
  inorganic filter aid among which perlite and diatomaceous earth;
  and organic filter aid among which cellulose.

The addition of filter aid to the oil to be winterized can be performed in various manners. It is generally preferred to add continuously a first part of the filter aid to the oil to be winterized so as to facilitate crystallization. Typically, this part of the filter aid is added into the first crystallizer tank by means of a dosing screw.

After a determined holding time, generally of from 4 to 10 hours, in a series of crystallizer tanks set at a final temperature of about 4 to 6° C., the waxes are crystallized and can be separated by filtration. A second part of the filter aid is then added discontinuously, to facilitate filtration by forming a filtering layer, on which the crystallized waxes are retained.

The filtration step starts with pre-coating, making a filter aid layer on the filter leaves thick and compact enough to remove the crystallized waxes. This pre-coat layer is formed by adding filter aid into a so-called pre-coating tank, from which the oil is circulated through the filter until it gets clear. Filtration of the oil with the crystallized waxes can thus start.

Before passing through the filters, the oil is optionally pre-heated up to about 15° C. so as to achieve adequate filtration rate. At this temperature, the oil shows a lower viscosity and the crystallized waxes do not re-dissolved. The oil is thus dewaxed by passing through the filter, while the waxes, along with the filter aid, are retained on the filter leaves. When filter reaches its maximum filtration capacity determined by monitoring pressure of filtration, or amount of filter aid on the leaves, or simply fixed by pre-set time), the filtration is stopped, the oil is drained, and the filter cake is deoiled.

For deoiling the filter cake, air or nitrogen is blown through the filter cake. Steam can also optionally be used after this first step. Deoiled material is then removed from the bottom/cone of the filter by means of a screw conveyor. Following this deoiling process and a filter cake discharge, the filter can thus be prepared for being reused in a new filtration cycle.

Winterization is known to be one of the most costly steps in the purification process of oils. This is mainly due to the fact that important quantities of filter aids have to be added to the oil, generally ranging from 1 to 15 kg per ton of oils (i.e. from 0.1 to 1.5% by weight). In addition, oil aggregates easily to the particles of filter aid leading to significant loss of oil. Depending on the type of filter aid used and on the implemented deoiling process, it is estimated that from 0.8 to 1.2 kg oil is lost with each kg of dosed filter aid.

Processes for recycling spent filter aid are therefore of high interest and value for the oil refining industry.

International patent application WO-A-2006/004454 teaches a recycling process of filtering powders (or filter aid) during the winterization step. According to this document, the used filtering powder is removed from the filter and is regenerated by mixing it with an additional fatty product to a paste condition. The paste is then heated with stirring to the melting point of all the waxes and the resultant mixture is separated by centrifugation to recover the dry filtering powder and the fatty product containing the waxes. Recycling step is thus performed in a separate vessel after removing the spent filter aid from the filter. A new set of equipment (vessel for regeneration, centrifuge to separate the regenerated filter aid and the oil) is needed to perform the regeneration of filter aids, thus increasing the cost of the global process and rendering the separation step complicate to handle.

To date, there remains a need for a process allowing an in situ multiple recycling of spent filter aid, said process being thus easy to handle, allowing an in-line process to regenerate filter aid inside the winterization filters. Said process should also allows reducing the amount of solid wastes generated during the winterization process.

It has now surprisingly been found that a process may reach the following objectives while remaining easy to handle.

Accordingly, the present invention relates to a process for in situ regeneration of spent filter aid comprising the steps of:
  a) circulating a regenerating oil through a spent filter aid cake in a circulation loop at a temperature of from 40° C. to 100° C., in a regenerating oil/spent filter aid (v/w) ratio of from 0.3/1 to 12/1;
  b) removing the regenerating oil from the treated spent filter aid cake; and
  c) recovering the regenerated filter aid.

Figure 1:
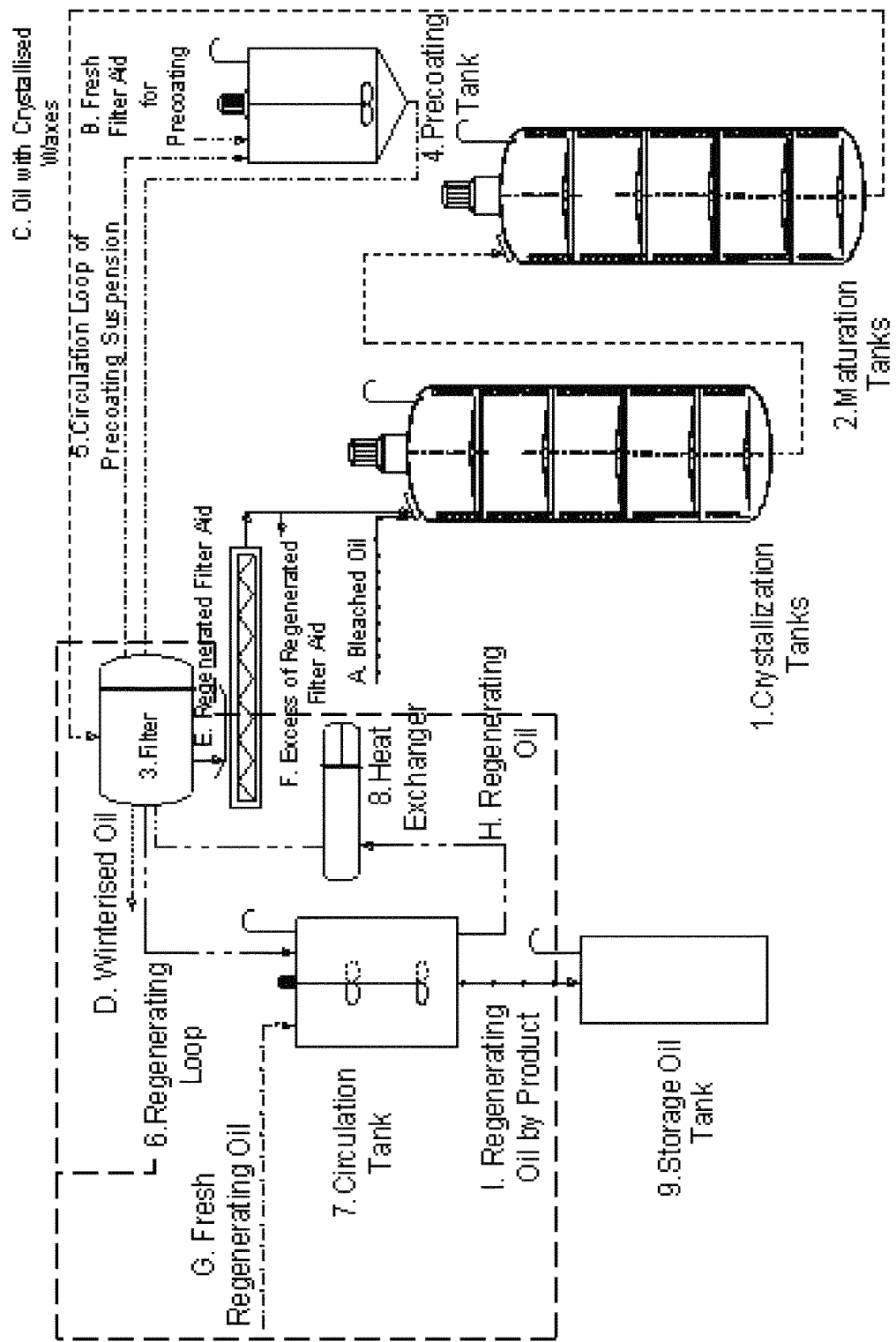
FIG. 1 illustrates an example of an installation allowing the implementation of the process according to the present disclosure.

In the context of the present invention:
- "winterization" and "dry dewaxing" both designate a process leading to the separation of the oils from the waxes by means of crystallization and filtration;
- "wax" designates any ester of long chain fatty acids and long chain alcohol that are naturally present in the oil and can cause turbidity in said oil;
- "circulation loop" designates the equipment used for recirculating the regenerating oil through the filter during the regeneration process. The loop generally comprises the filter itself, a circulation tank, and a circulation pump. It can also comprise a heater;
- "filter aid" designates a material used for facilitating crystal growth and assist the filtration during winterization. Filter aid can be inorganic or organic. Suitable examples of inorganic filter aid include perlite or diatomaceous earth. Suitable examples of inorganic filter aid include cellulose;
- "spent filter aid" designates a filter aid with the wax crystals on its surface removed from the oil during winterization;
- "regenerating filter aid" designates a process allowing a partial or total dewaxing of said filter aid to obtain a powder-like material ready for being used or re-used in a winterization process;
- "spent filter aid cake" designates the spent filter aid accumulated on the filter leaves during the filtration step of a winterization process.

In the context of the present invention, a regenerating oil/spent filter aid (v/w) ratio of from 0.3/1 to 12/1 means that 30 to 1200 liters of regenerating oil is needed to regenerate 100 kg of spent filter aid.

The process according to the present invention allows an in situ multiple regeneration of spent filter aid, while being easy to handle, allowing an in-line process to recycle filter aid inside the winterization filters and reducing the amount of solid wastes generated during the winterization process.

The present invention relates to a process for in situ regeneration of spent filter aid comprising a first step (step a)) of circulating a regenerating oil through a spent filter aid cake. Preferably, the present invention relates to a process for regenerating spent filter aid in which step a) is conducted under the following conditions, taken individually or in combination:
- the temperature under which the regenerating oil circulates through the spent filter aid cake is of from 45° C. to 85° C., more preferably of from 50° C. to 65° C.;
- the regenerating oil is circulating through the spent filter aid cake during 5 to 60 minutes, more preferably during 10 to 40 minutes, even more preferably during 20 to 30 minutes; and/or
- the regenerating oil/spent filter aid (v/w) ratio is of from 0.3/1 to 12/1; more preferably of from 1/1 to 9/1; even more preferably of from 2/1 to 6/1.

The regenerating oil used in the first step of the process according to the present invention may be any non-refined, partially refined or fully refined vegetable oil. Preferably, the regenerated oil is chosen as being partially refined or fully refined sunflower oil, olive oil, corn oil or cottonseed oil.

In a preferred embodiment of the process according to the present invention, the regenerating oil is chosen as being the same oil as the oil being winterised in the process having generated the spent filter aid.

The present invention relates to a process for in situ regeneration of spent filter aid comprising a second step (step b)) which consists in removing regenerating oil from the treated spent filter aid cake. Preferably, the present invention relates to a process for regenerating spent filter aid in which the regenerating oil is removed from the treated spent filter aid cake by draining and then blowing said cake. More preferably, the present invention relates to a process for regenerating spent filter aid in which step b) is conducted under the following conditions, taken individually or in combination:
- the spent filter aid cake is drained by air pressure;
- the cake of filter aid is not blown with steam;
- the cake of filter aid is blown with an appropriate gas medium such as air or an inert gas among which nitrogen;
- the cake of filter aid is blown during 10 to 40 minutes, even more preferably during 20 to 30 minutes.

At the end of step b) of the process according to the present invention, the cake of filter aid still contains regenerating oil. Preferably, at the end of step b) of the process according to the present invention, the treated spent filter aid cake contains from 35% to 50%, more preferably from 40% to 45% of regenerating oil.

The present invention relates to a process for in situ regeneration of spent filter aid comprising a third step (step c)) which consists in recovering the regenerated filter aid. The recovery of the regenerated filter aid is made by discharging said regenerated filter aid from the filter. This step may be conducted according to any known method classically used by the skilled artisan. For example, regenerated filter aid cake is removed from the filter leaves by vibration and mechanical cleaning and then discharged by a screw conveyor from the hopper of the filter.

The regenerated filter aid may thus be reintroduced in the winterization process in the same way as any other filter aid.

With the process according to the present invention, filter aid may be regenerated and re-used in a winterization process multiple times. Consequently, with the process according to the present invention, the quantity of solid wastes generated by a winterization process is deeply reduced.

Another advantage of the process according to the present invention resides in that multiple recycling of filter aids using the same regenerating oil is possible.

With the process according to the present invention, the same regenerating oil can be reused up to 5 times, preferably up to 3 times for regenerating spent filter aid.

Finally, after having been used once or several times in the process according to the present invention, the regenerating oil contains high or such amount of wax allowing its use for food, feed or non-food applications. This obviates the need to treat the recovered regenerating oil as a waste.

The process according to the present invention can be conducted using already existing winterization equipment. There is no need to significantly modify existing installations. Minor adaptations of said installations are sufficient and no extra-floor space in existing refining plant is needed.

FIG. 1 illustrates an example of installation allowing the implementation of the process according to the present invention. The bleached oil (A) or more generally the oil entering the winterization process is precooled in a series of heat exchangers (not shown) and then fed into a series of crystallization tanks (1) and maturation tanks (2).

In the classical winterization process, filter aid is mixed into the oil in the first crystallization tank. In the process according to the present invention the regenerated filter aid is added at this point. The oil is further cooled in the crystallization and maturation tanks, where it is allowed to stay for a period of time suitable to allow the wax crystallization and crystal growing.

The oil with the crystallized waxes may optionally be preheated using a heat exchanger (not shown) and then sent to the previously precoated filter (3).

Precoating is done applying a circulation loop (5): fresh filter aid for precoating (B) is added into the precoating tank (4), where it is mixed with oil. This mixture is circulated through the filter until an adequate precoat layer is built up on the filter leaves. During filtration, the filtered oil called winterized oil (D) leaves the filter crystal clear and the filter aid with the waxes accumulate on the filter leaves. Regeneration of spent filters aid takes place after the filtration has ended. A determined volume of oil circulates in the regeneration loop (7), including the filter, circulation tank (6) and a heat exchanger (8). Said oil is heated to the desired regeneration temperature using the heat exchanger.

When regeneration of filter aid is over, circulation of the regenerating oil in the regeneration loop is stopped and the regenerating oil is collected in the circulation tank. As the filter is emptied into the circulation tank, the filter cake is blown with air or inert gas, for example nitrogen. The oil from blowing is also introduced in the circulation tank.

The oil collected in the circulation tank can be used for in another regeneration step or can be removed from the loop, sending it to a storage tank (9). This waxy regenerating oil by-product can be sold for further use or re-used within the plant. After blowing the regenerated filter aid (E) is removed from the filter and then added back in the winterization process as described before. As some fresh filter aid is applied for precoating, the total amount of regenerated filter aid is somewhat higher than the amount added back in the process.

The excess of regenerated filter aid (F) is taken out of the regenerated filter aid stream and used the same way as the spent filter aid in the classical winterization process.

The present invention will now be illustrated in a non-limiting manner by the following examples.

EXAMPLE 1

Filter aid regeneration was performed in industrial winterization unit operating with sunflower oil. One filter of said unit was dedicated for regeneration. The filtration rate was 11 t/h, 1.24 tons of filter aid (weight gives as fresh, oil-free filter aid) accumulated on the filter leaves during the filtration period.

Regeneration of spent filter aid started directly without emptying the filter, by adding 12 m$^3$ of hot (98° C.) deodorised sunflower oil into the recirculating loop, which was mixed with the oil in the filter. The total volume in the loop was 24 m$^3$.

The oil in the recirculation loop cooled down to 50° C. during the 25 minutes recirculation.

Wax content of the regenerating oil has been measured at different times during the regeneration. The results are reported in Table 1 below. The wax content at time "0" refers to the wax content of the oil introduced to the regeneration loop.

TABLE 1

| Regeneration time (min) | Wax content of the regenerating oil (mg/kg) |
|---|---|
| 0 | 32 |
| 15 | 2050 |
| 20 | 3620 |
| 25 | 4500 |

After 25 minutes of regeneration and 20 minutes of blowing with air, the regenerating oil contained 4500 mg/kg of wax and the regenerated filter aid contained 46% (w/w) of oil.

2.31 tons of spent filter aid (1.24 tons on oil free basis) have thus been regenerated.

The regenerating oil/spent filter aid (v/w) ratio was 10.4.

The regenerated filter aid was then collected and added back to the winterization process, to the first crystallizer.

EXAMPLE 2

In the winterization unit described in Example 1, filter aid regeneration on a dedicated filter was performed as described below.

In a series of tests, the filtration rate was 10 to 11t/h, and 1.32 to 1.44 tons of filter aid (weight given as fresh, oil-free filter aid) was accumulated on the filter leaves during the filtration period.

Regeneration of spent filter aid started directly without emptying the filter, by adding 5 m$^3$ of hot (95-98° C.) bleached sunflower oil into the recirculating loop, which was mixed with the oil in the filter.

The total volume in the loop was 17 m$^3$.

A heat exchanger was installed in the recirculation loop so that the oil in the loop was gradually heated to 80-85° C.

Wax content of the regenerating oil has been measured depending on duration of regeneration step. The results are reported in Table 2 below. The wax content at time "0" refers to the wax content of the bleached oil introduced to the regeneration loop.

TABLE 2

| Test | Regeneration time (min) | Wax content of the regenerating oil (mg/kg) | Oil content of the regenerated filter aid (%) |
|---|---|---|---|
| Test 2.1 | 0 | 246 | — |
|  | 20 | 6680 | N/E |
|  | 40 | 8200 | N/E |
| Test 2.2 | 0 | 260 | — |
|  | 20 | 3800 | N/E |
|  | 40 | 8100 | N/E |
| Test 2.3 | 0 | 470 | — |
|  | 40 | 13400 | 45.2 |
| Test 2.4 | 0 | 470 | — |
|  | 40 | 15300 | 44.1 |

Increasing of the temperature of the regenerating oil speeds-up the regeneration process and higher amount of wax is recovered from spent filter aid.

In tests 2.1/2.2 and 2.3/2.4, the difference in the wax content of the regenerating oil after 40 minutes regeneration was primarily due to the difference in the wax content of the bleached oil entering the winterization.

In each case, the regenerated filter aid had powder like appearance and was added into the first crystallizer of the winterization process.

Because of the decreased amount of oil in the regeneration loop, the regenerating oil/spent filter aid (v/w) ratio was 6.5 and 7.2 in test 2.3 and 2.4 respectively.

EXAMPLE 3

Multiple regenerations of spent filter aid have been performed under the experimental conditions reported in example 2.

The regenerated filter aid was added back to the first crystallizer and then regenerated again when appearing on the filter.

During the test, only regenerated filter aid was added into the first crystallizer, but fresh filter aid was used for pre-coating the filters.

In this experiment, filter aid has been regenerated 4 times obtaining powder like appearance in each case.

Analysis of Regenerated Filter Aid and of Regenerating Oil

After each regeneration step, the regenerated filter aid and the regenerating oil were analyzed. The results are reported in the Table 3 below.

TABLE 3

| Regeneration step | Regeneration temperature (° C.) | Regeneration time (min) | % (w/w) of oil in regenerated filter aid | Wax in regenerating oil (mg/kg) |
|---|---|---|---|---|
| 1 | 85 | 40 | 45.0 | 15600 |
| 2 | 85 | 40 | 43.9 | 13700 |
| 3 | 85 | 25 | 39.8 | 6500 |
| 4 | 85 | 40 | 44.2 | 13300 |

The results show that regenerating for 40 minutes results in more efficient removal of waxes from the spent filter aid than in case of 25 minutes regeneration. The performance of the winterization did not change concerning the wax content of winterized oil.

Oxidative Parameters

In addition, to check the influence of the multiple regeneration of filter aid on the secondary oxidation products in the fully refined oil, the para-anizidine value has been determined.

Para-anizidine value of the fully refined sunflower oil after "n" regeneration (n=0 means the use of fresh filter aid, no regeneration) has thus been evaluated. The results are reported in the Table 4 below.

TABLE 4

| n | Para-anizidine value |
|---|---|
| 0 | 4.2 |
| 1 | 3.6 |
| 2 | 3.1 |
| 3 | 3.2 |
| 4 | 3.1 |

The para-anizidine value of the refined oil while using regenerated filter aid did not increase, even slight decrease was observed in the deodorized oil corresponding to the first two regeneration steps.

This means that the use of regenerated filter aid does not influence negatively the oxidative properties of the refined oil, but even slight improvement can be obtained.

EXAMPLE 4

Multiple regeneration cycles with the same regenerating oil was carried out at pilot plant scale as reported below.

Figure 2:
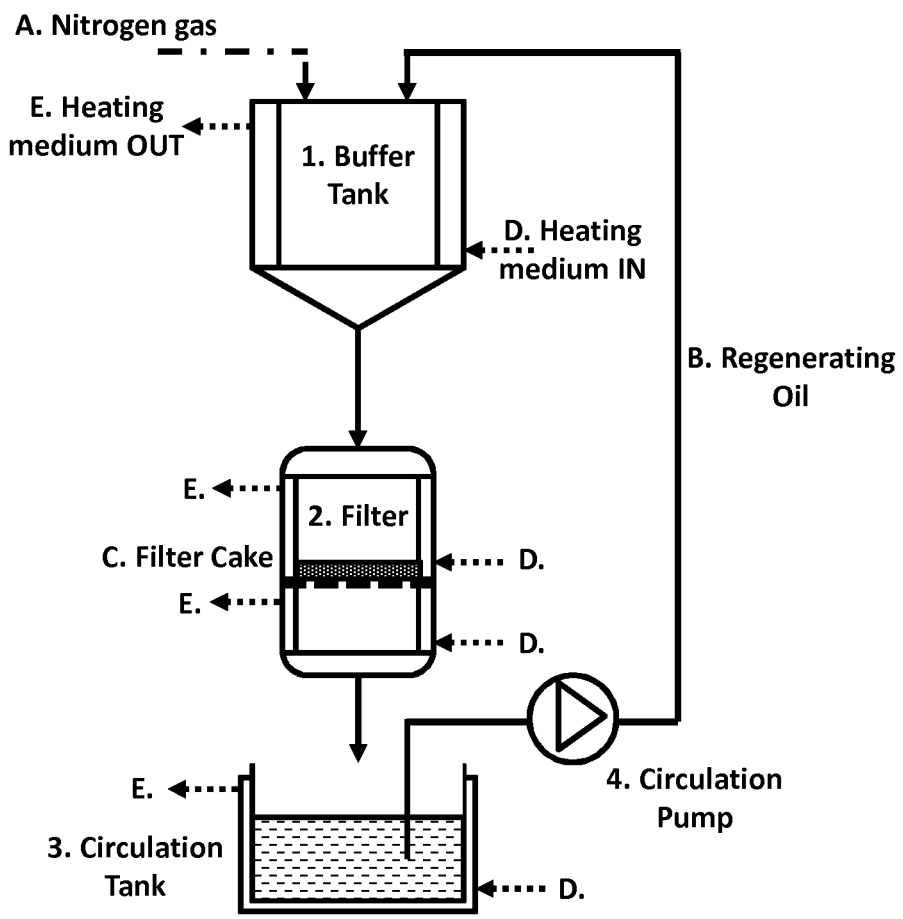
FIG. 2 illustrates a laboratory regenerating loop.

A laboratory regenerating loop (see FIG. 2) consisting of a buffer tank (1), a filter (2) with 269 $cm^2$ surface, a circulation tank (3), and a circulation pump (4) was installed.

The loop was operated as follows: spent filter aid (C) received from an industrial winterization unit was added to the filter. The filter was filled up with fresh regenerating oil, preheated to the desired regenerating temperature. The buffer tank, filter and the circulation tank were also tempered (the inlet and outlet points of the heating liquid are marked by D and E). Nitrogen gas (A) was applied to achieve the desired flow through the filter. The regenerating oil (B) was then collected in the circulation tank, from where it was forwarded into the buffer tank (also under nitrogen pressure) by the circulation pump.

Ten regenerating cycles were carried out under standardized conditions. Regeneration temperature was 75° C., spent filter aid amount was about 300 g, the regenerating oil/spent filter aid (v/w) ratio was 6/1 in each cycle. The oil flow rate was 22 l/h (20-25 l/h).

The regenerating oil (refined rapeseed oil containing less than 10 mg/kg of wax) was pushed through the filter cake by applying 1 bar nitrogen overpressure. The time of one regeneration cycle was 30 minutes. The same regenerating oil was used in each cycle while always a new batch of spent filter aid was regenerated.

After each regeneration step, the wax content of the regenerating oil and the oil content of the regenerated filter aid were analyzed. The results are reported in the Table 5 below.

TABLE 5

| Regeneration cycle | % (w/w) of oil in regenerated filter aid | Wax in regenerating oil (mg/kg) | The regenerating oil/spent filter aid (v/w) ratio in individual cycle | The regenerating oil/spent filter aid (v/w) ratio in overall cycles |
|---|---|---|---|---|
| 1 | 53.3 | 2100 | 6/1 | 6/1 |
| 2 | 53.7 | 4660 | 6/1 | 3/1 |
| 3 | 49.3 | 7640 | 6/1 | 2/1 |
| 4 | 52.6 | 9170 | 6/1 | 1.5/1 |
| 5 | 48.8 | 10900 | 6/1 | 1.2/1 |
| 6 | 48.7 | 12300 | 6/1 | 1/1 |
| 7 | 48.9 | 13800 | 6/1 | 0.86/1 |
| 8 | 45.9 | 16100 | 6/1 | 0.75/1 |
| 9 | 46.3 | 18400 | 6/1 | 0.67/1 |
| 10 | 47.1 | 21100 | 6/1 | 0.60/1 |

In all regeneration steps, the regenerated material had powder-like appearance, with an oil content of 45.9-53.3%.

The wax content of the regenerating oil increased gradually with the number of its re-use from 2100 mg/kg after the first cycle to 21100 mg/kg after the tenth.

The above example shows that the regenerating oil can be used in multiple regeneration steps, allowing an efficient decrease of the amount of regenerating oil:the regenerating oil/spent filter aid (v/w) ratio being of 6/1 in each individual regeneration cycle, the v/w ratio of regenerating oil/total spent filter aid is consequently of 0.60/1 after ten cycles.

The invention claimed is:
1. A process for in situ regeneration of spent filter aid from a winterization process on a pressure leaf filter comprising the successive steps of:

a) circulating a regenerating oil through a spent filter aid cake in a direction of filtration in a circulation loop at a temperature of from 40° C. to 100° C., in a regenerating oil/spent filter aid (v/w) ratio of from 0.3/1 to 12/1;

b) removing a portion of the regenerating oil from the spent filter aid cake resulting from step a), by draining using air pressure and then blowing using air or an inert gas, wherein the spent filter aid cake is not blown with steam, to form a treated spent filter aid cake containing from 35% to 50% of regenerating oil; and c) recovering the treated spent filter aid cake thus regenerated.

2. A process according to claim 1, wherein the regenerating oil is a non-refined, partially refined or fully refined vegetable oil.

3. A process according to claim 2, wherein the vegetable oil is chosen as being partially refined or fully refined sunflower oil, olive oil, corn oil or cottonseed oil.

4. A process according to claim 1, wherein the regenerating oil is chosen as being the same oil as the oil being winterized in the winterization process having generated the spent filter aid.

5. A process according to claim 1, wherein the regenerating oil circulates through the spent filter aid cake at a temperature of from 45° C. to 85° C.

6. A process according to claim 1, wherein the regenerating oil is circulating through the spent filter aid cake during 5 to 60 minutes.

7. A process according to claim 1, wherein the regenerating oil/spent filter aid (v/w) ratio of from 1/1 to 9/1.

8. A process according to claim 1, wherein the spent filter aid cake is located in the pressure leaf filter, and the pressure leaf filter is located in an oil winterization apparatus.

* * * * *